(12) United States Patent  
Gafri

(10) Patent No.: US 12,215,045 B2  
(45) Date of Patent: Feb. 4, 2025

(54) SYSTEM AND METHOD FOR TREATMENT OF WASTEWATER FLUIDS

(71) Applicant: WADIS LTD., Nes Ziona (IL)

(72) Inventor: Oren Gafri, Rishon Le-Zion (IL)

(73) Assignee: WADIS LTD., Nes Ziona (IL)

( * ) Notice: Subject to any disclaimer, the term of this patent is extended or adjusted under 35 U.S.C. 154(b) by 715 days.

(21) Appl. No.: 17/414,526

(22) PCT Filed: Sep. 24, 2019

(86) PCT No.: PCT/IL2019/051050  
§ 371 (c)(1),  
(2) Date: Jun. 16, 2021

(87) PCT Pub. No.: WO2020/129039  
PCT Pub. Date: Jun. 25, 2020

(65) Prior Publication Data  
US 2022/0048795 A1  Feb. 17, 2022

(30) Foreign Application Priority Data  
Dec. 16, 2018  (IL) .......................................... 263724

(51) Int. Cl.  
*C02F 1/46* (2023.01)  
*C02F 1/467* (2023.01)  
(Continued)

(52) U.S. Cl.  
CPC .......... *C02F 1/4672* (2013.01); *C02F 1/4608* (2013.01); *C02F 2001/46171* (2013.01); *C02F 2101/306* (2013.01); *C02F 2103/06* (2013.01); *C02F 2103/343* (2013.01); *C02F 2201/46175* (2013.01); *C02F 2303/04* (2013.01); *C02F 2303/26* (2013.01); *C02F 2305/023* (2013.01)

(58) Field of Classification Search  
CPC ...... C02F 1/46; C02F 1/48; C02F 1/72; C02F 1/32; C02F 1/36  
See application file for complete search history.

(56) References Cited

U.S. PATENT DOCUMENTS 3,366,564 A   1/1968  Merton  
3,402,120 A   9/1968  Merton et al.  
(Continued)

*Primary Examiner* — Walter D. Griffin  
*Assistant Examiner* — Cameron J Allen  
(74) *Attorney, Agent, or Firm* — FISHERBROYLES, LLP; Roger L. Browdy; James E. Mrose

(57) ABSTRACT

A system and method for treatment of a wastewater fluid is described. The system includes a gas supply system to provide a process gas into the wastewater fluid, a pulsed electrical-power generator to generate high electrical voltage pulses and a reactor apparatus pneumatically coupled to the gas supply system, and electrically coupled to the pulsed electrical-power generator. The reactor apparatus is configured to produce a plurality of gas microbubbles of the process gas injected into the wastewater fluid supplied into the reactor apparatus for the treatment, and to apply the high electrical voltage pulses generated by the pulsed electrical-power generator to said plurality of the microbubbles. The high electrical voltage pulses have energy sufficient to create a plasma glow discharge within the plurality of the microbubbles, and in an interface of the microbubbles with the wastewater fluid.

27 Claims, 7 Drawing Sheets

(51) Int. Cl.
    *C02F 1/461*     (2023.01)
    *C02F 101/30*    (2006.01)
    *C02F 103/06*    (2006.01)
    *C02F 103/34*    (2006.01)

(56) References Cited

U.S. PATENT DOCUMENTS

| | | |
|---|---|---|
| 4,957,606 A     | 9/1990  | Juvan |
| 6,328,898 B1 *  | 12/2001 | Akiyama .............. C02F 1/4608 |
| | | 210/205 |
| 6,491,820 B2    | 12/2002 | Chauhan et al. |
| 6,540,919 B2    | 4/2003  | Chauhan et al. |
| 6,709,594 B2    | 3/2004  | Chauhan et al. |
| 7,001,520 B2    | 2/2006  | Chauhun |
| 9,868,653 B2 *  | 1/2018  | Denvir ................. C02F 1/4608 |
| 9,932,252 B2    | 4/2018  | Boesch et al. |
| 2005/0189278 A1 | 9/2005  | Iijima |
| 2015/0136591 A1 | 5/2015  | Fraim et al. |
| 2015/0251933 A1 | 9/2015  | Nakamura |
| 2017/0281813 A1 * | 10/2017 | Egawa ................ H01J 37/3244 |

* cited by examiner

SYSTEM AND METHOD FOR TREATMENT OF WASTEWATER FLUIDS

FIELD OF THE INVENTION

This invention relates to systems and methods for treatment of liquids, sludge or other wastewater fluids containing durable organic contaminants, such as high bacterial and/or organic content, toxins, hormones, anti-biotics and other materials of organic nature; and more particularly to a system for the treatment of wastewater fluids by using electrical discharge and advanced oxidation processes.

BACKGROUND OF THE INVENTION

Harmful materials and pathogens found in contaminated and/or wastewater fluids, including pond water, ground run-off water, infested or contaminated lakes and rivers, wastewater, wastewater sludge and waste activated sludge, can present a significant risk to the environment and to human health, if left untreated. Accordingly, various organic, inorganic, chemical, and microbial components of wastewater fluids must be treated before waste products may be re-used or discharged to the environment. Examples of such wastewater fluids include contaminated ground-water, algae infested lake water, polluted stream water, industrial waste sludge, municipal wastewater, chemical processing effluent, paper mill effluent, livestock waste, hydroponic and fish-culture water, etc.

Many types of treatment techniques are known for wastewater treatment. These techniques can employ physical, chemical and biological processes, or, in some cases combinations of these operations. For example, it is known to use advanced oxidation processes (AOPs) to treat wastewater in the wastewater treatment industry. The basic principle of AOPs involves production of reactive oxygen species, such as hydroxyl radicals (·OH), and interaction of these reactive species with organic compounds in wastewater. As a result of such interaction, the organic compounds can degrade, deconstruct, defuse, deactivate and/or detoxify. Thus, AOPs significantly diminish the concentration of pollutants in the wastewater.

The AOPs are also useful for eliminating pathogens, by having the radicals attack and destroy proteins forming the cell walls of bacteria and capsules of viruses.

The AOPs are useful for a number of reasons, including the high reactivity of hydroxyl radicals and their applicability in oxidizing a range of organic and inorganic contaminants, their ability to treat organic compounds directly when in an aqueous phase, and the absence of additional hazardous substances or waste streams.

Examples of advanced oxidation processes include those in which oxygen ($O_2$), ozone ($O_3$), hydrogen peroxide ($H_2O_2$) and/or ultraviolet (UV) radiation are used to generate hydroxyl radicals in the reaction process, either alone, or in combination with one another. Some advanced oxidation techniques use metal oxide catalysts such as titanium dioxide ($TiO_2$) or aluminum oxide ($Al_2O_3$) in order to lower activation energies, lower ozone consumption, and/or to enhance reaction parameters.

Techniques that employ pulsed electrical fields by applying powerful non-arcing electrical current to wastewater fluids are described in U.S. Pat. Nos. 6,491,820; 6,540,919; 6,709,594 and 7,001,520. In such techniques, wastewater fluid is placed between two electrodes, which generate a high-intensity electrical field. The pulsed electrical field provides electroporation of cell walls of micro-organisms within the wastewater fluid, causing disruption of the cellular structure and breaking down intra-cellular and inter-cellular molecular bonds of microbial cells. As a result, intra-cellular and intercellular water is released from the microbial cells. After releasing the intra-cellular and inter-cellular water, the organic solid contents, suspended in solution, are reduced in volume and mass, which can simplify wastewater post-treatment processes.

A technique known in the art, usually under the name "electro-hydraulics", utilizes arcing high-voltage electrical discharge into a volume of liquid or slurries or other fluid for the purpose of disinfecting, changing chemical constituents and recovering metals and other substances from the fluids (see, for example, U.S. Pat. No. 3,366,564 to Allen; U.S. Pat. No. 3,402,120 to Allen et al.; and U.S. Pat. No. 4,957,606 to Juvan). According to this technique, an electro-hydraulic shock wave within the liquid or slurries, intensive light radiation and thermo-chemical reactions are initiated by arc discharge formed in the spark gap formed between the electrodes immersed in such fluids.

GENERAL DESCRIPTION

There is still a need in the art for, and it would be useful to have, a novel system that provides fast and easy treatment of wastewater fluids.

It would be advantageous to combine, synergistically, the effects of the advanced oxidation processes (AOPs) and the techniques utilizing high voltage electrical discharge, for treatment of wastewater fluid in the wastewater treatment industry. The term "wastewater fluid" is broadly used in this patent specification to describe any liquid with high bacterial and/or organic contamination content.

The present invention improves on the prior art of AOPs, simplifying the process of hydroxyl generation so that the design and operation of the system for treatment of wastewater fluids are improved.

Due to the instability and short lifespan of hydroxyl radicals, they must be generated within the treated fluid from interactions with other, more stable compounds, that can be mixed into the treated fluid.

The reactions used in the prior art techniques include mixing of pre-fabricated hydrogen-peroxide into the treated fluid, and then splitting it into hydroxyl by use of a catalyst and/or UV irradiation:

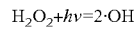

It is also known in the prior art techniques to use oxygen to generate ozone, and then to mix it into the treated fluid to interact with the water in the fluid and locally produce hydrogen-peroxide or hydroxide that can further react to form hydroxyl:

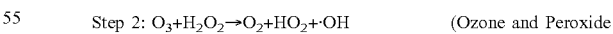     (Ozone and Peroxide

     (Ozone and Hydroxide)

The present invention employs a combination of electron donation and a localized concentrated electric field in order to split oxygen into ionized and excited mono-atomic oxygen that can directly react with the water to form hydroxyl, and also react with oxygen to form ozone for further hydroxyl generation.

     (Electric split of $O_2$ to mono-oxygen)

     (Water electrolysis Hydroxyl reaction)

$$O+H_2O: O+H \rightarrow 2 \cdot OH + \cdot OH \quad \text{(Mono-oxygen reactions)}$$

$$O+O_2 \rightarrow O_3 \quad \text{(Excess oxygen to ozone reaction)}$$

Thus, according to the present invention, the rate of hydroxyl production can be increased owing to the producing of mono-atomic oxygen directly with a theoretical conversion rate of four ·OH for one $O_2$. Moreover, according to the present invention, Ozone can also be produced as a by-product that can be used for further advanced oxidation.

According to some embodiments of the present invention, treatment of wastewater fluid is achieved by application of an electrical discharge to bubbles of a process gas injected into the wastewater fluid.

According to some embodiments of the present invention, the process gas can be an inert gas serving only as a medium for electron transfer and/or providing gas-liquid surface for a plasma glow discharge within the treated wastewater fluid. Alternatively, the process gas can be a chemically reactive gas serving as an oxidizer source and/or a reaction element for the process.

The combined action of a high-intensity electrical field and the process gas can further elevate the treatment reactivity, and enhance production of hydroxyl and other radicals in the wastewater for disinfecting the wastewater fluid, oxidizing a broad range of organic and inorganic contaminants, changing chemical constituents of the wastewater fluid, and breaking down intra-cellular and intercellular molecular bonds of microbial cells residing in the wastewater fluid.

Thus, it would be advantageous to have a novel system and method that can be sufficiently reliable and efficient for implementation at a wastewater plant for treatment of wastewater sludge and other wastewater fluids at any stage. In particular, it would be advantageous to have a technique that can be employed for treatment of primary sludge to remove contaminating and toxic organic and inorganic compounds, for treatment of activated sludge via destruction of flocks and clumps of micro-organisms to expose them all to treatment, for destruction of most of the individual cellular units and the cellular units assembled in flocs in waste activated sludge by exposing the inner organic matter for useful digestion, and for removing intercellular water from digested sludge in combination with other conventional dewatering techniques. The system can also be effectively used for decontamination of secondary wastewater effluent, to destroy or remove contaminating and toxic materials, pathogenic bacteria, and harmful suspended materials.

Likewise, it would be advantageous to have a technique that can be employed for treatment of groundwater and drinking water to destroy or remove pathogenic bacteria, toxins, drug residues, and substances which produce color, taste and odor.

The present invention partially eliminates disadvantages of conventional techniques and provides a novel system for treatment of wastewater fluid. The wastewater fluid system includes a gas supply system configured to inject a process gas into the wastewater fluid, a pulsed electrical-power generator configured to generate high electrical voltage pulses, and a reactor apparatus pneumatically coupled to the gas supply system, and electrically coupled to the pulsed electrical-power generator.

According to some embodiments of the present invention, the reactor apparatus is configured to produce a plurality of gas microbubbles of the process gas injected into the wastewater fluid which is supplied into the reactor apparatus for the treatment. The reactor apparatus is also configured to apply the high electrical voltage pulses generated by the pulsed electrical-power generator to the plurality of the microbubbles. The high electrical voltage pulses have energy sufficient to create a plasma glow discharge inside the plurality of the microbubbles, and respectively in an interface of the microbubbles with the wastewater fluid, thereby resulting in an intense electrical field capable to ionize, excite, or otherwise activate the process gas to higher reactivity, and/or in a partial electrolysis of the treated wastewater fluid.

According to some embodiments of the present invention, the reactor apparatus includes a housing. The housing includes a gas input plenum, a reaction chamber, and a gas chamber.

According to some embodiments of the present invention, the gas input plenum is arranged at a lower portion of the housing and includes a pneumatic inlet configured to receive the process gas from the gas supply system. The gas chamber is arranged at an upper portion of the housing and includes a pneumatic outlet for releasing reaction gas products collected at the gas chamber during the treatment of the wastewater fluid. The reaction chamber is arranged between the gas input plenum and the gas chamber.

According to some embodiments of the present invention, the reaction chamber includes a hydraulic inlet configured for receiving a wastewater fluid, and a hydraulic outlet for releasing the wastewater fluid from the reaction chamber after treatment.

According to some embodiments of the present invention, the reaction chamber also includes a supporting plate arranged at the bottom of the reaction chamber and separating the reaction chamber from the gas input plenum. The supporting plate is configured to hold a plurality of tubular electrodes. Each of the tubular electrodes includes a protruding portion and a passing portion. The protruding portion of the tubular electrodes protrudes from the potential plate and is configured to provide a conductive or capacitive electrical coupling to the wastewater fluid treated in the reaction chamber. The passing portion of the tubular electrodes passes through the supporting plate to provide pneumatic communication between the gas input plenum and the reaction chamber for supplying the reaction gas for production of the microbubbles.

According to some embodiments of the present invention, the reactor apparatus further includes a potential electrode and a grounded electrode. The potential electrode is electrically connected to a bottom side of the potential plate and passes through or around the gas input plenum. The grounded electrode is electrically connected to a top side of the grounded plate and passes through or around the gas chamber. The potential electrode and the grounded electrode can, for example, be coupled to the pulsed electrical-power generator via a high-voltage low-impedance connection, such as a coaxial cable.

According to an embodiments of the present invention, the supporting plate is a potential plate being electrically conductive. In this case, the potential electrode is electrically connected to a bottom side of the potential plate, while a grounded electrode is electrically connected to a top side of the grounded plate.

According to an embodiments of the present invention, the supporting plate is made from an electrically isolative material having a high dielectric strength. In this case, the potential electrode is electrically connected the plurality of tubular electrodes via electrical wires.

According to some embodiments of the present invention, the reaction chamber also includes a grounded plate arranged at a top portion of the reaction chamber and separating the reaction chamber from the gas chamber. The grounded plate includes a plurality of openings passing through the grounded plate from the reaction chamber towards the gas chamber. The openings enable an excess gas mixture containing the chemically active gas released from the microbubbles that reaches the grounded plate and other reaction gas products produced during the treatment to pass through the plurality of the openings and be collected in the gas chamber.

According to some embodiments of the present invention, the grounded plate is conductively or capacitively coupled to the treated fluid. A gap between the potential plate and the grounded plate can, for example, be in the range of 10 mm to 50 mm.

According to some embodiments of the present invention, the tubular electrodes are tapered or bifurcated to have a sharp or pointed top edge configured to concentrate and intensify the local electric field. An outer diameter of the tubular electrodes can, for example, be in the range of 0.1 mm to 5 mm.

According to some embodiments of the present invention, the reaction chamber further includes an insulator plate arranged on a top surface of the potential plate. The insulator plate includes a plurality of capillary openings passing through the potential plate and entering the reaction chamber. The capillary openings are configured to tightly accommodate protruding portions of the tubular electrodes that protrude from the potential plate.

According to some embodiments of the present invention, the capillary holes further include an insert arranged between inner walls of the capillary holes and the tubular electrodes.

According to some embodiments of the present invention, the inner surface of the capillary openings is constructed of, or coated with, a material acting as catalyst to facilitate activation, and ionizing of the process gas.

According to some embodiments of the present invention, these capillary openings are constructed of, or coated with, a material acting to shape the electrical field, so as to create zones of strong localized electrical fields to facilitate activation and ionizing of the process gas.

According to some embodiments of the present invention, a height of the protruding portions of the tubular electrodes is smaller than a total width of the insulator plate to form capillary holes within the capillary openings extending from a top surface of the insulator plate toward the protruding ends of the tubular electrodes. A diameter of the capillary holes can, for example, be in the range of 0.1 mm to 5 mm, a total width of the insulator plate can, for example, be in the range of 5 mm to 50 mm, and a depth of the capillary holes can, for example, be in the range of 5 mm to 10 mm.

According to some embodiments of the present invention, the wastewater treatment system further includes a contact tank arranged downstream of the reactor chamber. The contact tank is hydraulically coupled to the reaction chamber of the reactor apparatus via an outlet tube to receive wastewater fluid leaving the reaction chamber. The contact tank is also pneumatically coupled to the pneumatic outlet of the gas chamber via a gas product tube to receive an excess gas mixture. The excess gas mixture contains the process gas released from the microbubbles reaching the gas chamber and also other reaction gas products produced during treatment with the high electrical voltage pulses.

According to an embodiment of the present invention, the outlet tube connecting the reactor apparatus to the contact tank is a cone shaped tube operating on the basis of the Venturi effect to collect the excess gas mixture.

According to some embodiments of the present invention, the wastewater treatment system further includes a nanobubble generator arranged upstream of the reactor apparatus for pre-treatment of the wastewater fluid supplied for the treatment. The nanobubble generator is pneumatically coupled to the pneumatic outlet of the excess gas collection chamber via a gas product tube. The nanobubble generator is configured to receive process gas and/or process gas products produced during the plasma discharge within the microbubbles, and in the interface between the microbubbles and the wastewater fluid, and to introduce these gases into the wastewater fluid as nanobubbles.

According to some embodiments of the present invention, the system comprises a nanobubble generator arranged upstream of the reactor apparatus for pre-treatment of the wastewater fluid supplied for the treatment. According to this embodiment, the nanobubble generator is pneumatically coupled to the contact tank.

According to some embodiments of the present invention, the system comprises a nanobubble generator arranged upstream of the reactor apparatus for pre-treatment of the wastewater fluid supplied for the treatment. According to this embodiment, the nanobubble generator is pneumatically coupled to the gas supply system.

The wastewater treatment system of the present invention has many of the advantages of the prior art techniques, while simultaneously overcoming some of the disadvantages normally associated therewith.

The wastewater treatment system according to the present invention may be easily and efficiently fabricated and marketed.

The wastewater treatment system according to the present invention is of durable and reliable construction.

The wastewater treatment system according to the present invention may have a relatively low manufacturing cost.

According to another general aspect of the present invention, there is provided a method for treatment of a wastewater fluid. The method includes receiving the wastewater fluid for treatment, producing a plurality of gas microbubbles of a process gas in the wastewater fluid, and applying high electrical voltage pulses to the plurality of microbubbles. The high electrical voltage pulses have energy sufficient to create a plasma glow discharge inside the plurality of the microbubbles, and, respectively, in the interface of the microbubbles with the wastewater fluid.

According to some embodiments of the present invention, a voltage amplitude of the high electrical voltage pulses is in the range sufficient to create localized electrical fields capable to electrically activate and ionize the process gas.

According to some embodiments of the present invention, a voltage amplitude of the high electrical voltage pulses is in the range sufficient to reach 5.2 eV electron plasma temperature and to split $O_2$ gas in order to react with $H_2O$ and $O_2$ and to produce *OH and $O_3$ by using an electrical field in the range of 30 kV/cm to 60 kV/cm with a peak pulsed current in the range of 100 A to 5 kA.

According to some embodiments of the present invention, a voltage amplitude of the high electrical voltage pulses is in the range of 15 kV/cm to 60 kV/cm, a peak pulsed current can be in the range of 100 A to 5 kA, a pulse width of the high electrical voltage pulses can be in the range of 10 nanoseconds to 100 nanoseconds, and a pulse repetition rate can be in the range of 10 pps to $10^4$ pps (pulses per second).

According to some embodiments of the present invention, the method for treatment of wastewater fluids further includes collecting an excess gas mixture containing the process gas released from the microbubbles and other reaction gas products produced during the treatment of the wastewater fluid with the high electrical voltage pulses, and applying the excess gas mixture to the wastewater fluid treated by the plasma glow discharge through a cone shaped tube operating on the basis of the Venturi effect for continuation of treatment of the wastewater fluid.

According to some embodiments of the present invention, the method for treatment of wastewater fluids further includes collecting an excess gas mixture containing the process gas released from the microbubbles and other reaction gas products produced during the treatment with the high electrical voltage pulses, producing nanobubbles containing the excess gas mixture, and pretreating the wastewater fluid by injecting nanobubbles into the wastewater fluid. The pretreating of the wastewater fluid is carried out before the steps of producing the plurality of gas microbubbles of a process gas in the wastewater fluid and applying the high electrical voltage pulses.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF EMBODIMENTS

Figure 1:
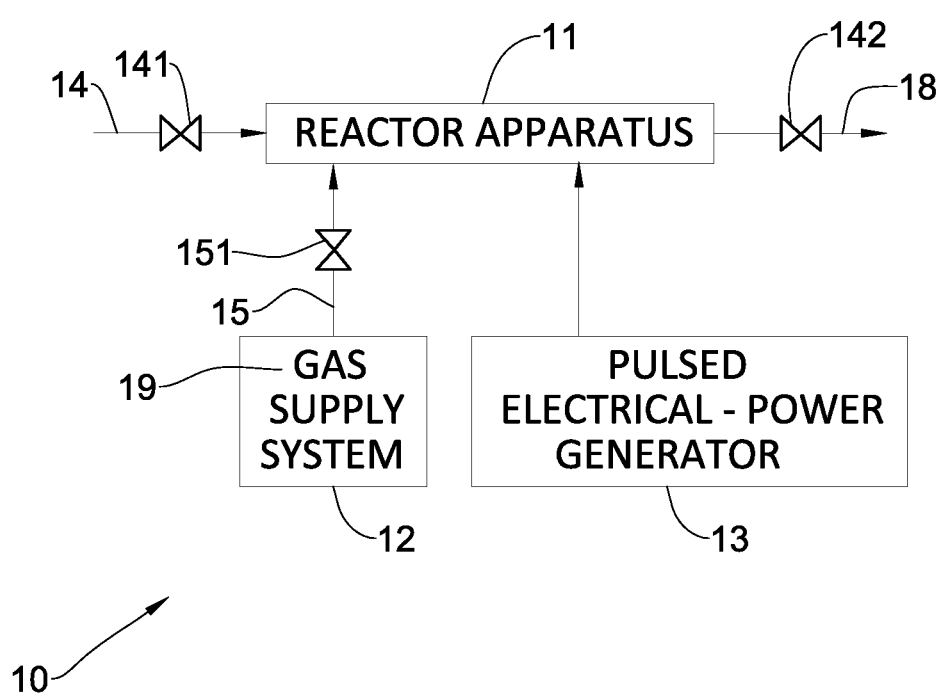
FIG. 1 illustrates a schematic block diagram of a system for treatment of a wastewater fluid, according to an embodiment of the present invention.

The principles and operation of the system for treatment of wastewater fluid according to the present invention may be better understood with reference to the drawings and the accompanying description, wherein like reference numerals have been used throughout to designate identical elements, where it is convenient for description. It should be understood that these drawings, which are not necessarily to scale, are given for illustrative purposes only, and are not intended to limit the scope of the invention. Examples of constructions are provided for selected elements. Those versed in the art should appreciate that many of the examples provided have suitable alternatives which may be utilized.

Referring to FIG. 1, a schematic block diagram of a system 10 for treatment of a wastewater fluid is illustrated, according to an embodiment of the present invention. A stream of the wastewater fluid is shown by reference numeral 14. The wastewater treatment system 10 includes a reactor apparatus 11 that is configured to create plasma discharge within a plurality of microbubbles (not shown) of a process gas injected into the wastewater fluid which is supplied into the reactor apparatus 11, and, respectively, in an interface of the microbubbles with the wastewater fluid.

The dimensions of the microbubbles can, for example, be in the range of 0.1 microns to 1000 microns. The type of process gas used for creation of the microbubbles depends on the type of wastewater fluid. Examples of gases suitable for the purpose of the present application include, but are not limited to, air, oxygen, ozone, carbon dioxide, and mixtures thereof.

The bubble-based plasma discharge created within the wastewater is accompanied by ultraviolet (UV) radiation, generation of shock waves, and formation of a variety of chemically active species and charged particles including reactive free radicals, electrons, and ions. Due to the large difference between the dielectric constant of water, $\varepsilon_w \approx 81$, and the dielectric constant of gas, $\varepsilon_g \approx 1$, a significant increase in the electrical field in the gas microbubbles can be obtained, when compared to the electrical field in water. Such an enhanced electrical field can be sufficient to initiate the electrical discharge accompanied by plasma formation inside the gas microbubbles. Simple estimation shows that an electrical field $E=\varepsilon_{ion}n_g\sigma_{ion}/e \geq 25$ kV/cm is required in order to obtain an electron avalanching process in a gas at the normal pressure, accompanied by the plasma formation, where $\varepsilon_{ion} \approx 10$ eV=$1.6 \cdot 10^{-18}$ J is the typical ionization energy, $n_g \approx 2.6 \cdot 10^{25}$ m$^{-3}$ is the gas density, $\sigma_{ion} \approx 10^{-20}$ m$^2$ is the typical ionization cross-section and e=$1.6 \cdot 10^{-19}$ C is the electron charge. Indeed, the mean path of electrons in the gas can be estimated as $\lambda_e=(n_g\sigma_i)^{-1} \approx 4$ µm (microns), which is significantly smaller than typical sizes of the bubbles having hundreds of microns or even greater diameters. The use of the bubble-based plasma discharge not only reduces the required electric breakdown threshold as compared with the water discharge, thereby reducing the energy input to produce reactive species, but also provides efficient and rapid delivery of reactive species into the fluid, and increases the interaction between the fluid and the plasma.

It was shown by the inventors of the present application that such a bubble-based plasma discharge created within the wastewater fluid can enhance advanced oxidation processes (AOPs) occurring in the wastewater fluid for creation of active radicals, such as hydroxyl radicals, hydrogen peroxide, ozone, nitrate ions, and other chemical radicals. During treatment, active radicals can oxidize, hydrolyze, and thus decompose or deactivate various materials and chemicals, such as organic compounds, organic matter, toxins, hormones, chemical compounds, residual metals, herbicides, and other contaminations that may be present in the wastewater fluid.

The wastewater treatment system 10 also includes a gas supply system 12 pneumatically coupled to the reactor apparatus 11, and a pulsed electrical-power generator 13 electrically coupled to the reactor apparatus 11.

The gas supply system 12 is configured to supply a process gas 19 into the wastewater fluid 14 that is treated in the reactor apparatus 11, for production of a plurality of gas microbubbles in the wastewater fluid. Construction and implementation of the gas supply system 12 depends on the type of process gas selected for the treatment process, that is based on the type of pollution of the wastewater fluid.

Thus, according to one embodiment of the present invention, the gas supply system 12 includes a gas tank (not shown) storing the process gas, and configured to release the gas when required. According to another embodiment, the gas supply system 12 includes one or more compressors (not shown) configured to provide air or any other desired gas at a desired pressure into the reactor apparatus 11. According to yet another embodiment, the gas supply system 12 includes one or more generators (not shown) configured to produce any desired gas and supply the gas at a desired pressure into the reactor apparatus 11.

It should be noted that an egress stream 18 that exits the reactor apparatus 11, includes a mixture of a treated liquid and excess process gases. As is described hereinbelow in detail, the egress stream 18 can enter into a downstream mixer (not shown in FIG. 1), a storage tank (not shown in FIG. 1), and/or into a gas-liquid separator (not shown in FIG. 1).

The system 10 also includes controllable valves 141, 142 and 151 to control and achieve the desired flow rates, pressure, and mixture ratio of the wastewater fluid, as is described hereinbelow.

The pulsed electrical-power generator 13 is configured to provide high electrical voltage pulses having energy sufficient to create the plasma glow discharge within the bubbles and in the interface between the bubbles and the wastewater, and/or to provide electrical activation of the reaction gas. Construction and implementation of the pulsed electrical-power generator 13 suitable for the purpose of the present invention is described hereinbelow in detail.

Figure 2:
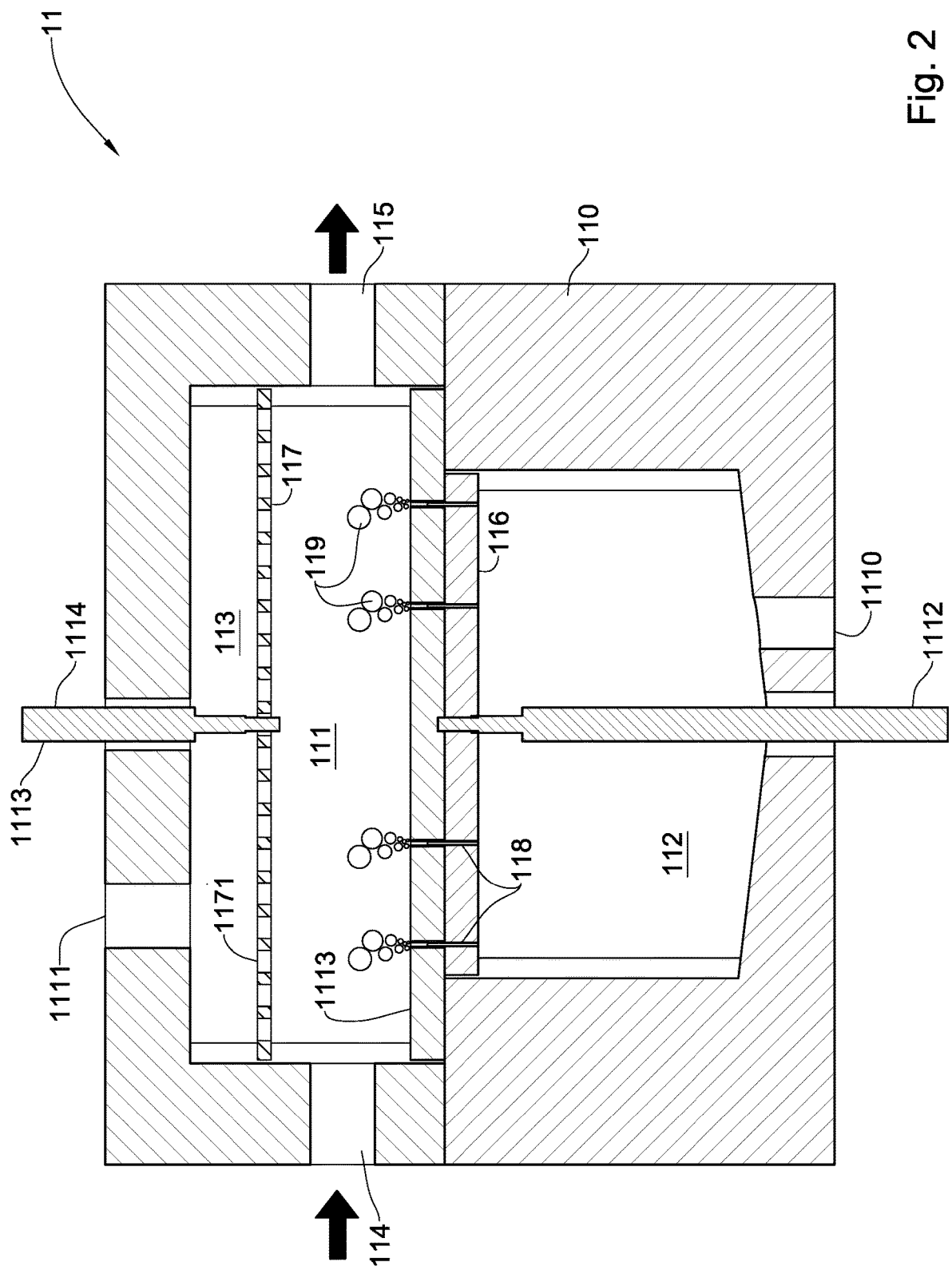
FIG. 2 illustrates a cross-sectional schematic view of a reactor apparatus of the system of FIG. 1, according to an embodiment of the present invention.

Referring to FIG. 2, a cross-sectional schematic view of the reactor apparatus 11 is illustrated, according to an embodiment of the present invention. The reactor apparatus 11 includes a housing 110 containing a gas input plenum 112 arranged at a lower portion of the housing 110, a gas collection chamber 113 arranged at an upper portion of the housing 110, and a reaction chamber 111 arranged between the gas input plenum 112 and the gas collection chamber 113 of the housing 110. The term "housing" is broadly used in this patent specification to describe any container, tank, vessel, frame assembly or any other structure that has a body which can be used for holding a wastewater fluid and a process gas during treatment, in accordance with the teachings of the present invention. The housing 110 can be constructed of a suitable metal, plastic or composite material suitable for the chemicals in the treated fluid and reactive gases, providing proper insulation of charged parts of the reactor apparatus 11, and having sufficient strength and thickness of walls in order to withstand the strain on the walls caused by the pressure, shocks, and flows inside the reaction chamber 111.

According to some embodiments of the present invention, the reaction chamber 111 includes a hydraulic inlet 114 configured for introducing the wastewater fluid 14 into the reaction chamber 111 via a hydraulic inlet conduit (not shown).

According to some embodiments of the present invention, reaction chamber 111 also includes a hydraulic outlet 115 configured for releasing the wastewater fluid from the reaction chamber 111 after treatment, to facilitate the continuous flow mode. Outlet 115 may also act to release excess process gas as the bi-phase egress stream (18 in FIG. 1), or may serve as a liquid-only outlet.

According to some embodiments of the present invention, the reaction chamber 111 can operate in a batch mode, where the wastewater fluid under treatment is a portion of liquid placed into the reaction chamber 111 for treatment. According to some embodiments of the present invention, the reaction chamber 111 can operate in a continuous flow mode, with the wastewater fluid continually flowing through the reaction chamber 111.

Referring to FIGS. 1 and 2 together, the controllable inlet valve 141 of the wastewater treatment system 10 is arranged within the inlet conduit of the wastewater fluid 14 upstream of the inlet 114, while the controllable outlet valve 142 is arranged downstream of the outlet 115 within an outlet conduit (not shown) for the egress stream 18. The controllable inlet valve 141 and the controllable outlet valve 142 are configured for regulating a flow rate of ingress of the wastewater fluid provided for treatment and a flow of egress of the treated wastewater fluid to control the gas-liquid mixture ratio and pressure. The term "valve" as used herein has a broad meaning and relates to any electrical or mechanical device adapted to controllably regulate the flow rate and/or pressure of the process fluids.

The reaction chamber 111 includes a cathode at the bottom of the reaction chamber 111 and an anode at a top of the reaction chamber 111.

According to some embodiments of the present invention, the cathode is configured in the form of a supporting plate 116 arranged at the bottom of the reaction chamber 111.

According to an embodiment of the of the present invention, the supporting plate 116 is made from an electrically isolative material having a high dielectric strength. The electrically isolative material can, for example be polyimide, ceramics, nanoceramics, etc. The supporting plate 116 is configured to hold a plurality of tubular electrodes 118 passing through and protruding from the potential plate 116. In this case, the tubular electrodes 118 are directly connected to a potential electrode 1112 passing through the gas input plenum 112 via electrical wires (not shown). The tubular electrodes 118 receive electrons from the potential electrode 1112 and emit them in the stream of the wastewater fluid passing through the reaction chamber 11.

According to another embodiment of the of the present invention, the supporting plate 116 is an electrically conductive plate that is electrically connected to a potential electrode 1112 passing through the gas input plenum 112, and accordingly the supporting plate 116 is referred hereinafter as "potential plate 116". According to this embodiment, the tubular electrodes 118 are electrically coupled to the potential plate 116. The potential plate 116 receives electrons from the potential electrode 1112 and emits them via the tubular electrodes 118 in the stream of the wastewater fluid passing through the reaction chamber 11 in a manner described hereinbelow in detail.

According to some embodiments of the present invention, the anode includes a anode electrode that is configured in the form of a grounded plate 117 that is arranged at a top portion of the reaction chamber 111. The grounded plate 117 may either be in conductive contact or in capacitive coupling to the fluid under treatment. This grounded plate 117 serves to collect electrons passing through the reaction chamber 111, and to form a part of the required electrical field.

According to some embodiments of the present invention, the bottom side of the potential plate 116 is electrically connected to a potential electrode 1112 passing through the gas input plenum 112, while the top side of the grounded plate 117 is electrically connected to a grounded electrode 1114 passing through the gas collection chamber 113.

Connection of the potential electrode 1112 to the potential plate 116, and connection of the ground electrode 1114 to grounded plate 117, can be carried out by any suitable technique, such as by welding, brazing, soldering, etc., or by means of "plug and socket" suitable for electrical connection.

The potential plate 116 separates the reaction chamber 111 from the gas input plenum 112. A reaction zone of the reaction chamber 111 is formed in a gap between the potential plate 116 and the grounded plate 117. This gap can, for example, be in the range of 10 mm to 50 mm.

The gas collection chamber 113 is located above the grounded plate 117 that separates the reaction chamber 111 from the gas chamber 113.

Figure 3:
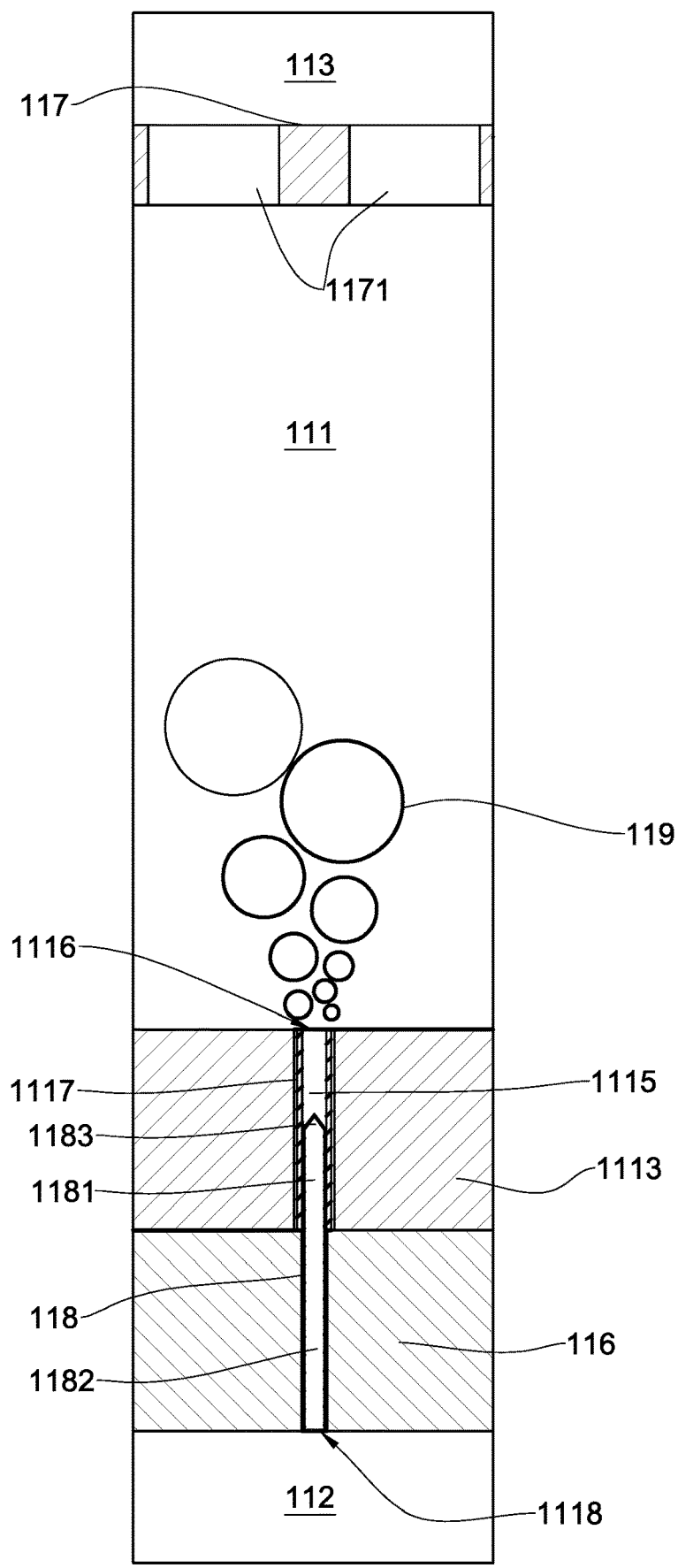
FIG. 3 illustrates an enlarged cross-sectional schematic view of a portion of the reactor apparatus including an inter-electrode gap between the potential plate and the grounded plate, according to an embodiment of the present invention.

Referring to FIG. 3, an enlarged cross-sectional schematic view of a portion of the reactor apparatus 11 is illustrated, according to an embodiment of the present invention. This schematic view illustrates an inter-electrode gap between the potential plate 116 and the grounded plate 117. According to this embodiment, the potential plate 116 is configured to hold a plurality of tubular electrodes 118 passing through and protruding from the potential plate 116. Each of the tubular electrodes 118 has a protruding portion 1181 that protrudes from the potential plate 116 and a passing portion 1182 that passes through the potential plate 116.

The protruding portions 1181 of the tubular electrodes 118 are configured to provide a conductive or capacitive electrical coupling to the wastewater fluid treated in the reaction chamber 111. The tubular electrodes 118 are also configured to provide localized concentrated electrical current densities and electrical fields.

The tubular electrodes 118 are configured, inter alia, to provide pneumatic communication between the gas input plenum 112 and the reaction chamber 111. Pneumatic communication between the gas input plenum 112 and the reaction chamber 111 is needed to form a plurality of microbubbles 119 of the process gas and injection of the bubbles into the wastewater fluid. In operation, the microbubbles 119 flow up within the wastewater fluid from the tubular electrodes 118 towards the grounded plate 117, then onward to the gas collection chamber 113.

According to an embodiment of the present invention, each tubular electrode 118 is tapered or bifurcated to have a sharp or pointed top edge 1183. These sharp top edges 1183 serve to concentrate and intensify the local electric field. The outer diameter of the tubular electrodes 118 can, for example, be in the range of 0.1 to 2 mm.

The tubular electrodes 118 can, for example, be made from an electrically conductive material with a relatively high conductivity and can be manufactured from metals of various groups, for example, stainless steel or multicomponent alloys suitable for the chemically active reaction gas being used. The tubular electrodes 118 are electrically connected to the potential plate 116 by any suitable technique, for example, by welding, brazing, soldering, etc. The outer diameter of the tubular electrodes 118 depends, inter alia, on the desired rate of process gas flow in the wastewater treatment application, the discharge energy and on the current density used for the treatment.

Turning back to FIGS. 1 and 2, according to some embodiments of the present invention, the gas input plenum 112 includes a pneumatic inlet 1110 pneumatically coupled to the gas supply system 12. The pneumatic inlet 1110 is configured for receiving the process gas 19 from the gas supply system 12.

According to some embodiments of the present invention, the controllable gas supply valve 151 of the system 10 is arranged within a conduit 15 pneumatically coupling the gas input plenum 112 to the gas supply system 12. The controllable gas supply valve 151 is configured for regulating a flow rate of egress of the process gas 19 into the gas input plenum 112. The gas can be supplied with elevated pressure. A pressure in the gas input plenum 112 suitable for the purpose of the present invention can, for example, be in the range of $(1-3) \cdot 10^5$ Pa.

Supply of the wastewater fluid into the reaction chamber 111 and supply of the process gas into the gas input plenum 112 are controlled by a control system (not shown in FIGS. 1 and 2). The control system is operatively coupled to the controllable inlet valve 141, the controllable outlet valve 142, and to the controllable gas supply valve 151, and is configured for controlling operation thereof for supply of the wastewater and the process gas into the reactor apparatus 11, and maintaining process parameters such as flow rates, pressure, mixture ratio, batch dwell time, etc.

According to some embodiments, the control system is a computer system that may generally include, without limitations, flow meters, sensors, actuators, monitoring devices, as well as other similar or suitable devices. Each may be a commercially available component. The control system also includes an electronic controller programmed with a software model stored in a computer-readable medium, and is configured for controlling operation of the wastewater treatment system 10.

Referring to FIGS. 2 and 3 together, according to some embodiments of the present invention, the grounded plate 117 includes a plurality of openings 1171. Each opening 1171 passes through the grounded plate (anode) 117 towards the gas collection chamber 113. The function of the opening 1171 is to allow the excess gas, formed from the unused process gas 19 and other gaseous products of the treatment process, to permeate through the grounded plate 117 to the gas collection chamber 113 without forming an excessive gas layer near or under the grounded plate 117 that may hinder the function of the grounded plate 117. A distance between the grounded plate 117 and a top inner wall of the housing 110 has an optimal predetermined value. It was wound that the distance value affect the quality of the treated fluid. Accordingly, the optimal value can, for example, be in the range of 3 mm to 10 mm.

The openings 1171 can, for example, have a circular shape of a predetermined diameter, equally spaced, and generally can be arranged in one or more rows, circles, etc., although other arrangements and configurations of the openings 1171 are contemplated. The diameter of the opening 1171 can, for example, be in the range of 1 to 5 mm.

According to some embodiments of the present invention, the reaction gas products can include oxygen, ozone and other reactive components that can be used in a further treatment of the wastewater fluid that is released from the reaction chamber 111 through the hydraulic outlet 115 for continuing and completing the AOPs. Accordingly, the gas collection chamber 113 includes a pneumatic outlet 1111 arranged in the housing 110 for releasing (e.g., siphoning) the reaction gas products.

One of the problems of underwater discharges in microbubbles formed by the gas injection through tubular electrodes 118 is the creation of a large stray capacitance C between the potential plate 116 (connected to the potential electrode 1112) from which the tubular electrodes protrude and the grounded plate 117 (connected to the ground electrode 1114). Indeed, in order to produce a high voltage gradient between the electrodes and, correspondingly, between the tubular electrodes 118 and the potential plate 116, one has to charge this large stray capacitance. For instance, in the case of an inter-electrode gap of 20 mm and potential plate diameter of 100 mm, the stray capacitance is C≈0.1 nF. Accordingly, in order to charge this capacitance within the time of 10 ns to the voltage of 30 kV, a pulse with a current amplitude of about 1.5 kA needs to be applied. Taking into account that discharge inside the bubbles is non-complete discharge, which should not lead to the shorting of the inter-electrode gap, only a few hundreds of A is required to ignite this discharge. However, the total current supplied by the generator should be about 2 kA. Thus, a high-current generator with impedance of 15Ω (Ohm) or under, and power in the range of 0.5-5 kW and operating with a high repetition rate in the range of 0.5-5 kHz, should be used.

In order to prevent completely arcing discharge between the electrodes, a short, nanosecond timescale application of the high voltage pulse is dictated, quenching the arc before it forms, and thus minimizing current losses through the fluid in the inter-electrode gap, which can be considered as a conductor with a resistance R connected in parallel to the stray capacitor C. Thus, discharge of the capacitor formed by the inter-electrode gap filled with water is accomplished with a typical discharge time $\tau=RC$. For instance, in the case considered above, the resistance of the inter-electrode gap filled with fluid can be about 300Ω for the water specific resistance $\rho=10$ kΩ·cm, which is a typical value of tap water. Such resistance of the inter-electrode gap provides a rather fast discharge of the potential with the discharge constant $\tau=30$ ns.

According to the present invention, a duration of the voltage pulse is short enough to avoid arcing discharge. For example, a pulse width of the high electrical voltage pulses can be in the range of 10 nanoseconds to 100 nanoseconds to permit only for plasma glow discharge, while avoiding any glow-to-arc transition between the two potential plates in the reaction chamber.

In order to avoid the disadvantages associated with the large value of the stray capacitance (resulting in an overly large charging current) and to achieve the fast discharge of this stray capacitance, the present invention teaches to cover the potential electrode by an insulator in order to avoid "galvanic" contact between the fluid and the potential electrode. Thus, according an embodiment of the present invention, the reaction chamber 111 includes an insulator plate 1113 arranged on a top surface of the potential plate 116. It should be noted that insulator plate 1113, inter alia, decreases the total capacitance between the potential and grounded electrodes.

The insulator plate 1113 has a high dielectric strength and is made, for example, from polyimide, ceramics, nanoceramics, etc. When desired, the insulator plate 1113 can be made from several insulating layers made from dielectric material that can be connected together by using a binder to increase dielectric breakdown resistance and improve erosion resistance.

The insulator plate 1113 has a plurality of capillary openings 1116 passing through the grounded plate 117 and entering the reaction chamber 111. The capillary openings 1116 serve as concentrators for the local electric field, and are configured to tightly accommodate portions of the tubular electrodes 118 which protrude from the potential plate 116.

According to an embodiment of the present invention, a height of the protruding portions of the tubular electrodes 118 is smaller than a total width of the insulator plate 1113, thus capillary holes 1115 are formed within the capillary openings 1116 that extend from a top surface of the insulator plate 1113 toward the protruding ends of the tubular electrodes 118. For example, an inner diameter of the capillary holes 1115 can, for example, be in the range of 0.1 mm to 5 mm, a total width of the insulator plate 1113 can, for example be in the range of 5 mm to 500 mm, and a depth of the capillary holes 1115 can, for example be in the range of 1 mm to 10 mm.

According to an embodiment of the present invention, the tubular electrodes 118 can have a borehole 1118 extending through the grounded plate 116 towards the gas input plenum 112. The boreholes 1118 serve as local conduits for the process gas which direct it through the high electrical field zone in the capillary holes 1115 and the capillary openings 1116 in order to be ionized and activated, before entering the reaction chamber 111 to form micro-bubbles 119.

Referring to FIGS. 1, 2 and 3 together, the potential electrode 1112 and the ground electrode 1114 are electrically coupled to the pulsed electrical-power generator 13. The electrical coupling can, for example be implemented via a high-voltage coaxial cable (not shown). The high-voltage coaxial cable can be connected to the potential electrode 1112 via its central (potential) core wire and to the ground electrode via the cable braid shield. The cable shield can be grounded or zeroed out. The electrical cable has an insulation layer between the core and the cable shield that is made of a dielectric material having high dielectric strength, for example, a type of Teflon (polytetrafluoroethylene), etc. In making the above-mentioned connection, the core of the cable with its insulation and the cable braid shield are pre-stripped from an external jacket of the coaxial cable. Connection of the core and the cable shield to the potential electrode 1112 and the ground electrode 1114, can be made by any suitable methods used in bounding of electrical wires.

The gas supplied to the gas input plenum 112 is distributed equally between the boreholes 1118 and the tubular electrodes 118, and enters the reaction chamber 111. The wastewater fluid that fills the volume of the reaction chamber 111 does not penetrate into the capillary holes 1115, and therefore there is no direct electrical contact between the wastewater and the tubular electrodes 118. This provision provides a large advantage of the system of the present invention over prior art systems, where electrodes are immersed in wastewater. Specifically, due to electrical field enhancement (up to factor $10^2$) at the needle top edge, an electrical field up to $10^7$ V/cm can be achieved, which is significantly greater than the electrical field threshold necessary for initiation of inter-gas electric discharge within the capillary holes 1115. It is important to note here, that since there is no direct electrical contact between the wastewater and the tubular electrodes 118, the gas discharge that occurs through the capillary holes 1115 results in an insignificant electrode erosion of the tubular electrodes 118, when compared to the case of underwater discharge, where electrodes are immersed in wastewater. Electrode erosion in the reaction chamber 111 can also be diminished, since such a gas discharge is not accompanied by formation of strong shock waves, which are typical for discharges in wastewater bulk.

As shown in FIG. 3, the capillary holes 1115 include an insert 1117 made of a non-conductive or poorly electrically conductive material. According to an embodiment, the insert 1117 is a sleeve placed between the inner wall of the capillary holes 1115 and the tubular electrodes 118. According to an embodiment, the insert 1117 is a coating on the inner wall of the capillary holes 1115. Examples of materials suitable for the insert 1117 include, but are not limited to, Alumina, Titanium oxide, and various Mesoporous materials.

The insert 1117 can act as a catalyst for activation of the process gas as it flows through. Moreover, insert 1117 can concentrate the local electric field in capillary holes 1115 and/or at the gas-liquid-insulation interface at the capillary openings 1116, to further improve the inter-gas electric discharge and/or the ionizing and activating of the process gas as it flows through the capillary openings 1116. The insert 1117 can also improve the durability of the insulator plate 1113 by shielding it from the chemical action of the process gas, as well as from heat and light generated by the gas plasma of the inter-gas electric discharge.

The gas plasma generated inside the capillary holes 1115 formed in the insulator plate 1113 is characterized by an electron temperature of several eV and a density in the range of $10^{14}$-$10^{16}$ cm$^{-3}$. Such plasma parameters provide increase of the pressure inside the capillary and ejection of the corresponding plasma microbubbles 119 into the wastewater volume. As a result, the effective gap between the potential plate 116 and the grounded plate 117 decreases, while the electrical field in the gap between the tubular electrodes 118 and the grounded plate 117 intensifies and provides more efficient plasma formation inside the microbubbles injected into this gap.

It should be noted that the electron-rich plasma with electron temperature beyond the 5.2 eV can split $O_2$ to generate *O and O$^-$ species. These can be energized with the electrons lent to higher orbital (from $\pi_u$ to $\pi_g$), aiding in hydroxyl conversion described above. Moreover, $O_3$ generation is also likely in this case.

Figure 4:
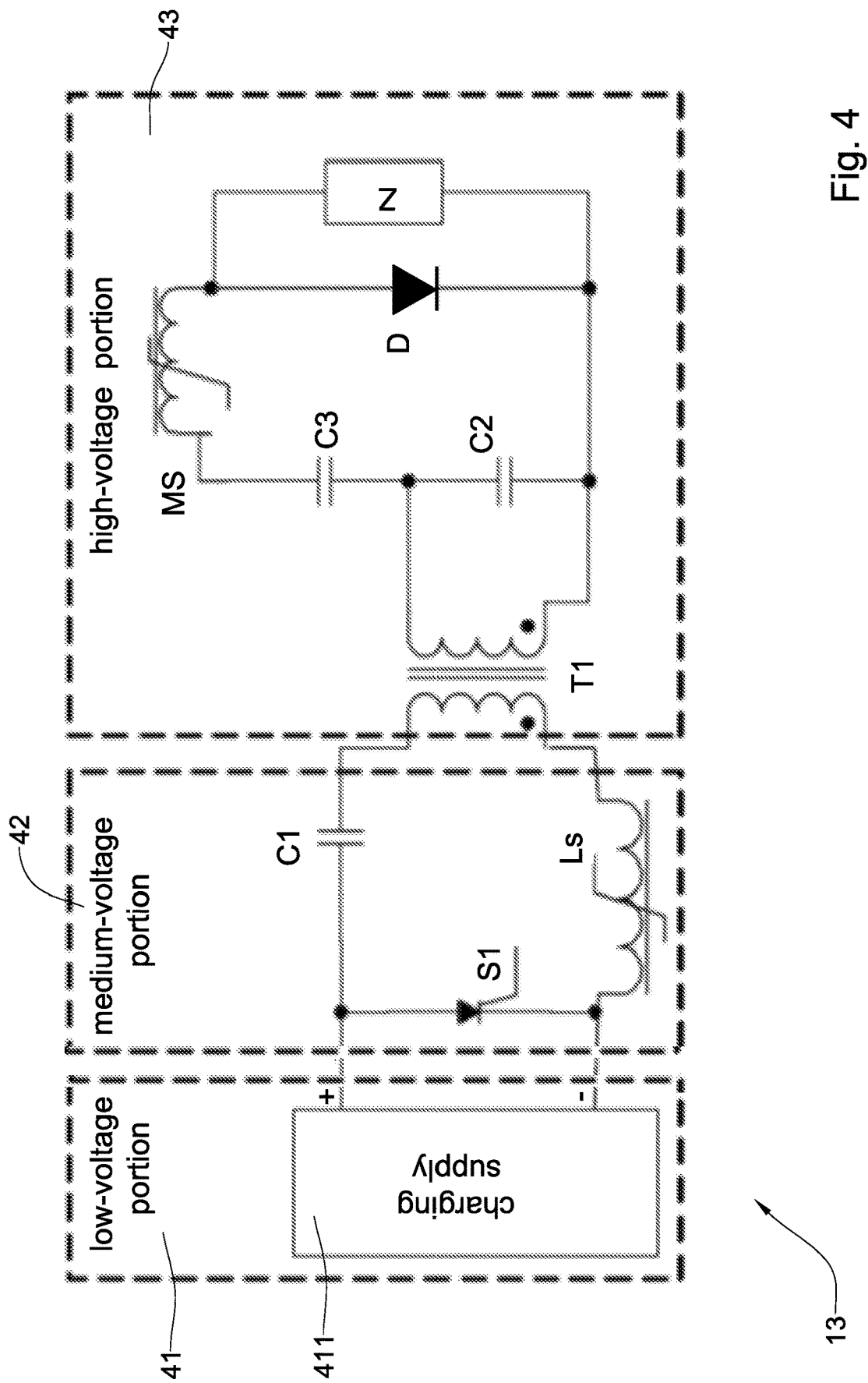
FIG. 4 illustrates an electrical scheme of a pulsed electrical-power generator for treatment of a wastewater fluid, according to one embodiment of the present invention.

Referring to FIG. 4, an electrical scheme of a pulse electrical-power generator 13 for treatment of a wastewater fluid is shown, according to one embodiment of the invention. The electrical scheme of FIG. 4 is based on the electrical scheme disclosed in U.S. Pat. No. 7,459,806, and shown in FIG. 4 at the configuration for generating a negative potential voltage.

As shown in FIG. 4, the pulse electrical-power generator 40 includes a low-voltage portion 41, a medium-voltage portion 42 and a high-voltage portion 43.

The low-voltage portion 41 includes a charging supply 411 and control means (not shown) for regulating the voltage provided by the charging supply 411.

The medium-voltage section 42 includes a primary energy storing capacitor C1 connected (at one terminal) to the positive terminal of the charging supply 411, and (at the other terminal) to the primary windings of a step-up transformer T1 at one end. The medium-voltage section 42 also includes an inductor Ls connected to the negative terminal of the charging supply 411 and to the primary windings of a step-up transformer T1 at another end, thereby completing the series circuit. The medium-voltage section 42 also includes a switch S1 connected across the terminals of the charging supply 411.

The high-voltage portion 43 is formed by a secondary winding of the step-up transformer T1 wound on a ferromagnetic core having a rectangular magnetization curve, a capacitor C2 connected across the secondary winding of the step-up transformer T1, and a capacitor C3 connected in series with the capacitor C2. The capacitor C3 is connected to the step-up transformer T1 through a magnetic switch element MS and a fast recovery diode D, forming a voltage doubler. The fast recovery diode D can, for example, be an array of one or more freewheeling diodes. The total impedance of the reaction apparatus (11 in FIG. 1) and all wiring and connections are represented in FIG. 4 as a load Z. Terminals of the load Z in FIG. 4 are the grounded electrode (1114 in FIG. 2) and the potential electrode (1112 in FIG. 2) of the reactor apparatus 11. The load output Z of the pulse generator is connected across the fast recovery diode D.

The charging supply 411 is a commercial device suitable for pulsed charging of the capacitor C1 via primary winding of the pulse step-up transformer T1 and the inductor Ls. The average power of the high-voltage charging supply 411 can, for example, be in the range of 1.5 kW to 2 kW, with an output voltage of up to 5 kV. For example, the EVA Series from Spellman High Voltage Electronics Corporation and/or the model 152-5 kV-POS from TDK-LAMBA Americas Inc. can be suitable for the purpose of the present invention. The charging supply 411 can be controlled by a TTL (Transistor-Transistor Logic) signal which can turn-on and turn off operation of the supply 411 with a required frequency of its operation, e.g., from 1 Hz to 1000 Hz.

In operation, when the charging supply 411 has charged C1 to the target voltage, it disconnects and the switch S1 closes, thereby discharging the capacitor C1 through Ls and step-up transformer T1 at a high ringing frequency. Accordingly, the capacitors C2 and C3 are charged with high voltage from the secondary winding of the transformer T1. Upon saturation of the T1 core, capacitor C2 recharges to the opposite polarity while diode D cut-off and the capacitor C3 maintain their former charge. Thus, the voltage across the capacitor assembly C2+C3 connected in series adds up to about double the T1 output voltage. At this moment, the current from discharge of the capacitor C3 through the secondary winding of the saturated transformer T1 enables the fast recovery diodes D to become in the open non-conducting state, while the core of magnetic switch MS saturates to become very conductive, and the voltage of C2+C3 is applied to the load Z, and the charge stored in the capacitor assembly C2+C3 is delivered to the load Z. The duration of the pulse is until the load current depletes the charge in the capacitor assembly C2+C3, or when the magnetic switch MS loses its saturation. Accordingly, a proper selection of the components of the pulse electrical-power generator 40 can yield a nanosecond time-scale pulse required for treatment of the wastewater fluid.

According to an embodiment of the present invention, the charging supply 411 charges the capacitor C1 to voltage up to 4 kV during time less than $10^{-3}$ s. The energy stored in capacitor C1, following requirement of the average power of the pulse electrical-power generator, should be greater than 1 J. This dictates the capacitance of this capacitor C1 to be greater than 0.125 µF. Such capacitors are available from General Atomic Companies and/or from HK Film Capacitor Ltd.

According to an embodiment of the present invention, the charging current of the capacitor C1 supplied by the high-voltage charging supply 411 is greater than 0.6 A, in order to charge the capacitor C1 to 4 kV during 1 ms (millisecond) or less. The total inductance of the charging circuit of the capacitor C1 with the inductor Ls and the primary winding of the pulse step-up transformer T1 should therefore be less than 10 µH (microhenry), in order not to limit the charging process.

After the charging of the capacitor C1 is completed, the high-voltage power supplied by the high-voltage charging supply 411 is turned off, and, with a time delay of several microseconds, the control pulse is supplied to the switch S1 to close it.

According to an embodiment of the present invention, the switch S1 includes a high-voltage and high-current avalanching thyristor. The main requirement for this thyristor is the possibility to switch current with the amplitude of 2 kA-3 kA, and dV/dt and dI/dt in the range of 2-4 kV/μs and 1-2 kA/μs or higher, correspondingly. Thyristors suitable for the purpose of the present invention, are, for example, commercially available from Infineon Technologies AG.

In the case in which the thyristor switch S1 is capable to operate with a rate $d\varphi/dt$ of changing a potential $\varphi$ across the thyristor switch S1 of 4 kV/μs, one can obtain discharge (during a quarter of period T) of the capacitor C1 (via the primary winding of the pulse step-up transformer T1 and the inductor Ls) during 1 μs. This results in the maximal amplitude of the discharge current $I=2\pi\varphi C/T \approx 800$ A and, respectively in dI/dt of about 0.8 kA/μs which the thyristor can sustain in a reliable mode. The total inductance (inductance of leads, the inductor Ls and the primary winding of the transformer T1) of the discharge circuit of the capacitor C1 should not exceed $L=T^2/4\pi^2C \leq 32.5$ μH, where C is the electrical capacitance of the capacitor C1.

According to an embodiment of the present invention, the pulsed step-up transformer T1 is at least a 1:8 transformer, in order to provide charging of the capacitors C2 and C3 up to a voltage of about 30 kV each and 60 kV total. The primary winding of the transformer T1 can, for example, be 2 turns and the secondary winding of the transformer T1 can be 16 turns, respectively. Charging of the capacitors C2 occurs via the secondary winding of the transformer T1, while charging of the capacitor C3 occurs via the secondary winding of the transformer T1, the magnetic switch MS and the fast recovery unidirectional semiconductor element D.

At the maximum charging of the capacitors C2 and C3, the transformer T1 should be transferred to saturation. This requires that the cross-section $S=V\Delta t/n\Delta B$ (in the case of the ferromagnetic materials with $\Delta B \approx 2$ T). For handling V up to 32 kV with the number of turns of n=16, the cross-section S needs to be around 18 cm².

The pulse step-up transformer T1 can, for example, be manufactured from an amorphous alloy. For example, toroidal amorphous metal cores ACP 110, (with a toroidal core outer diameter of 180 mm, a core inner diameter of 100 mm, and a core height of 50 mm) available from Advanced Core Production Ltd. (ACP) are suitable for the purpose of the present invention. The magnetic switch MS of the high-voltage portion 43 can, for example, be manufactured by using NiZn ferrites, in order to decrease losses at high frequency switching.

Due to core saturation of the pulse step-up transformer T1, the reluctance of T1 drops dramatically for the reverse cycle of the ringing discharge of C1, allowing a fast discharge followed by reversal charging of the capacitor C2 that results in doubling of the voltage at the output of the capacitor C3 supplied to the magnetic switch MS. The residual inductance of the secondary winding of the transformer T1, when it is constructed, for example, as two parallel coils, can be decreased to about 5 μH, thereby allowing the voltage on the capacitor C2 to be reversed in around 8 ns (assuming that C2, C3 are about 1.2 nF each so as to hold the required 1 J pulse energy at 30 kV).

During charging of the capacitor C3, the magnetic switch MS operates in a non-saturated mode. This means that MS should hold a voltage of 35 kV during this charging process, i.e., during about 1 μs. However, by the time the voltage on the capacitors C2 plus C3 increases up to 60-70 kV (due to the reversal discharge of the capacitor C2), the magnetic switch MS becomes saturated and a reversal discharge of the capacitors C2 plus C3 occurs via the saturated magnetic switch MS to the load Z and the fast recovery diode (unidirectional semiconductor element) D. Since the fast recovery diode D blocks this discharge within 30 ns-50 ns, a voltage of about 60 kV can appear across the diode D and load Z connected at the output of the magnetic switch MS. Thus, this high voltage is applied to the load Z.

According to an embodiment of the present invention, the magnetic switch MS can, for example, be manufactured as five wire turns wound on two stacked CMI NiZn toroidal cores (O.D.: 120 mm, I.D.: 60 mm, and a core height: 35 mm). The capacitors C2 and C3 can, for example, be an array of ceramic capacitors of 4 nF, 50 kV. The freewheeling diode(s) D can, for example, be assembled by using high-voltage fast-recovery diodes (80 BYX104G Philips) that have 50-ns recovery time. The diode assembly can, for example, include ten branches connected in parallel with eight diodes connected in series in each branch.

It should be noted that the pulse electrical power generator described above is a non-limiting example of pulse electrical power generators which can be used for the purpose of the present invention. Thus, in order to obtain efficient plasma formation, other pulse electrical power generators can also be used that can provide, for example, a voltage amplitude in the range of 25 kV/cm to 60 kV/cm, a peak pulsed current in the range of 100 A to 5 kA. a pulse width in the range of 10 nanoseconds to 100 nanoseconds, and a pulse repetition rate (pulse frequency) in the range of 10 pps to $10 \times 10^3$ pps (pulses per second). It should be noted that these values depend on the treatment parameters, such as flow rate and pollution type of the wastewater fluid, etc.

The wastewater treatment system 10 shown in FIG. 1 has been tested in several pollution models. Two configurations of the reactor apparatus 11 shown in FIG. 2 have been tested.

In a first configuration of the reactor apparatus 11, the potential plate 116 of the reaction chamber 111 included forty tubular electrodes 118 having 0.7 ID tubes. The gap between the potential plate 116 and the grounded plate 117 was set to 26 mm, while the distance between the grounded plate 117 and the top inner wall of the housing 110 was set to 20 mm. The pulse electrical-power generator having 1 KW power was used. The voltage amplitude was set from 25 kV to 40 kV, and the pulse repetition rate was set to 1,000 Hz. Oxygen was used as a process gas with a rate of 10 liters per minute. A rate of the wastewater flow was set to 1 cubic meter per hour.

In a first pollution model, efficiency of the treatment of the polluted water containing three pharmaceutical compounds, such as Iopromide (IPRM), Carbamazepine (CBZ) and Bezafibrate (BZF) was tested by using the reactor apparatus 11 of the first configuration. Iopromide is soluble in water and is usually not considered dangerous to the ecosystem. However, due to its common use in medical procedures, it can be found in massive amounts in wastewater fluids. Carbamazepine is an analgesic, non-narcotic and anticonvulsant, which is used as an anti-epileptic, for pain disorders, and for psychiatric treatment. When it is in relatively low concentrations (less than 18 mg/L) in water, it may be released to the environment through waste streams Bezafibrate is a fibrate drug used as a lipid-control agent to treat hyperlipidaemia. It shows a low solubility in water (about 1.55 mg/L) and pKa (acid dissociation constant) of 3.6, and can be found in wastewater and soil.

It was found by the applicant that treatment of such polluted water containing three pharmaceutical compounds by the wastewater treatment system 10 can reduce the content of Iopromide by 15-20%, the content of Carbamazepine by 90-100%, and the content of Bezafibrate by 30-50%. It should be noted that further decomposition can be achieved by using treatment with more time and/or energy.

In a second pollution model, efficiency of treatment of polluted water containing herbicides, acaricides and plant growth chemicals in industrial wastewater was tested by using the reactor apparatus 11 of the first configuration. The tests were carried out for wastewater containing the following components: Bromacil ($C_9H_{13}BrN_2O_2$), Clomazone (2-chlorobenzyl group bound to a N—O heterocycle), Florasulam ($C_{12}H_8F_3N_5O_3S$), Flurochloridone ($C_{12}H_{10}Cl_2F_3NO$), Imazamox ($C_{15}H_{19}N_3O_4$), Quinmerac ($C_{11}H_9ClNO_2$), and Terbutryn ($C_{10}H_{19}N_5S$).

The results of treatment of the wastewater of the second model by the system 10 of the first configuration are summarized in Table 1.

TABLE 1

| Compound | Inlet (mg/liter) | Outlet (mg/liter) | Removal (%) |
|---|---|---|---|
| Bromacil | 0.21 | 0.10 | 52.38 |
| Clomazone | 0.34 | 0.11 | 67.65 |
| Florasulam | 0.02 | 0.02 | 50.00 |
| Flurochloridone | 0.02 | 0.00 | 100.00 |
| Imazamox | 0.17 | 0.08 | 52.94 |
| Quinmerac | 0.08 | 0.03 | 62.25 |
| Terbutryn | 0.18 | 0.09 | 50.00 |

In a third pollution model, efficiency of treatment of contaminated groundwater containing diverse military industry pollutants, such as perchlorate, chlorate, nitrate, metals, and explosive components, such as RDX and HMX, was tested by using the reactor apparatus 11 of the first configuration, in combination with a bio-filter pretreatment. The groundwater under treatment contained these pollutants in the following concentrations: $ClO_4$—300 mg/lit, $ClO_3$—120 mg/lit, RDX—0.220 mg/lit, HMX—0.01 mg/lit, NO3—190 mg/lit, and Cr—0.350 mg/lit. The treatment results showed reduction of more than 60% in the nitro aromatics, and more than 90% in TNT, RDX, and HMX. The treatment was also effective in the reduction of Total Organic Carbon (TOC).

In a second configuration of the reactor apparatus 11, the potential plate 116 of the reaction chamber 111 included forty tubular electrodes 118 having 0.7 ID tubes. The gap between the potential plate 116 and the grounded plate 117 was set to 21 mm, while the distance between the grounded plate 117 and the top inner wall of the housing 110 was set to 7 mm. The pulse electrical-power generator having 1 KW power was used. The voltage amplitude was set from 25 kV to 40 kV, and the pulse repetition rate was set to 1,000 Hz. Oxygen was used as a process gas with a rate of 10 liters per minute. A rate of the wastewater flow was set to 1.8 cubic meter per hour.

In a fourth pollution model, efficiency of treatment of wastewater polluted with nine Trace Organic Contaminants (TrOCs), such as Sulfamethoxazole (SMX), Diclofenac (DCF), Carbamazepine (CBZ), Bezafibrate (BZF), Naproxen, Ibuprofen, Iopromide (IPRM), Iohexol (IHX), Iopamidol (IPDL) in wastewater was tested by using the reactor apparatus 11 of the second configuration.

The results of treatment of the wastewater of the fourth model by the system 10 of the second configuration are summarized in Table 2.

TABLE 2

| Compound | IPDL ng/L | HX ng/L | IPRM ng/L | Ibuprofen ng/L | Naproxen ng/L | BZF ng/L | CBZ ng/L | DCF ng/L | SMX ng/L |
|---|---|---|---|---|---|---|---|---|---|
| Before treatment | 32 | $2 \cdot 10^4$ | 6800 | 140 | 740 | 250 | 690 | $10^3$ | 200 |
| After treatment | <DL | 580 | 130 | <DL | <DL | <DL | <DL | <DL | <DL |
| Remains | 100% | 97% | 98% | 100% | 100% | 100% | 100% | 100% | 100% |

The treatment results showed that for most of the compounds the reduction is better than the detection limit (DL).

In a fifth pollution model, efficiency of disinfection of wastewater containing microorganisms was tested by using the reactor apparatus 11 of the second configuration.

The results of treatment of the wastewater of the fifth model by the system 10 of the second configuration are summarized in Table 3.

TABLE 3

| Micro-organisms | Coliform MPN/100 mL | Fecal Coliform MPN/100 mL | Fecal Streptococcus MPN/100 mL | Total bacterial count CFU/1 mL | Giardia n/10 L | Crypto-sporidium n/10 L |
|---|---|---|---|---|---|---|
| Before treatment | 1700 | 33 | <1.8 | 6600 | 0.8 | 0.4 |
| After treatment | 0 | 0 | 0 | 120 | 0 | 0 |

As can be seen the treatment by the system of the present invention was effective for disinfection of wastewater from microorganisms.

In a sixth pollution model, efficiency of disinfection of wastewater containing viruses was tested by using the reactor apparatus 11 of the second configuration.

The results of treatment of the wastewater of the fifth model by the system 10 of the second configuration are summarized in Table 4.

TABLE 4

| Viruses | Phages (pfu/ml) | Cell culture | Molecular adenovirus (pfu/ml) | Molecular norovirus (pfu/ml) |
|---|---|---|---|---|
| Before treatment | 11 | Positive (P) | P (32.4) | P (37.77) |
| After Bio-Filtration treatment | 2 | Negative | P (38.04) | Negative |
| After treatment by system 10 | 1 | Negative | Negative | Negative |

As can be seen the treatment by the system of the present invention was effective for disinfection of wastewater from viruses.

Figure 5:
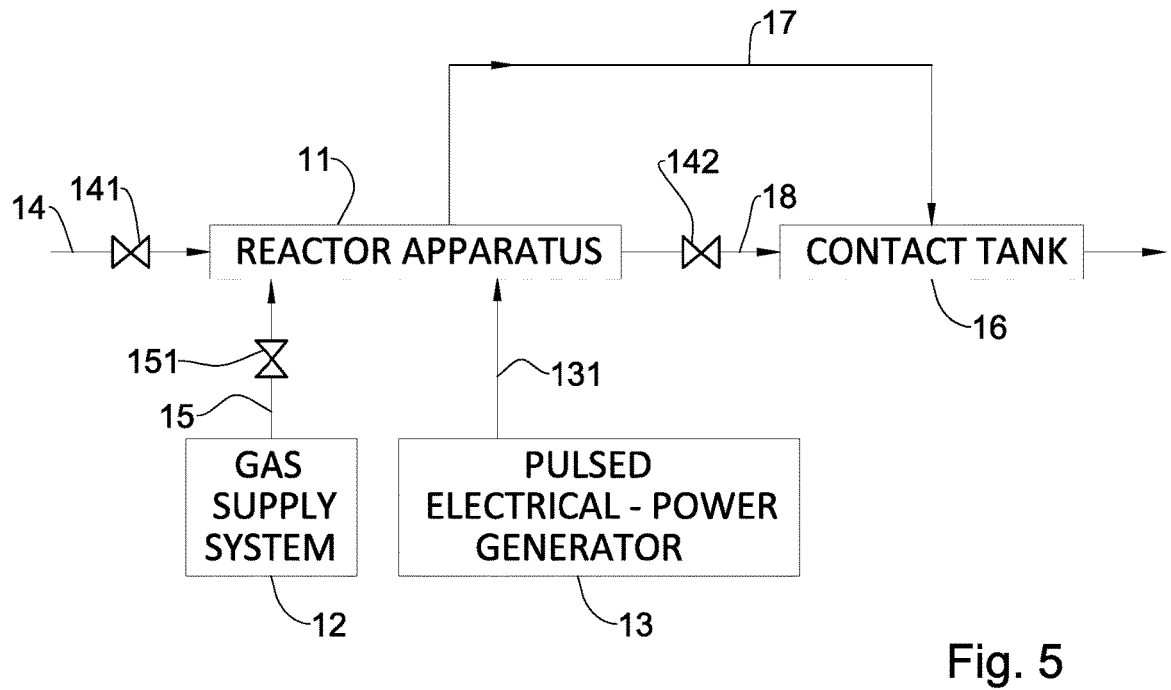
FIG. 5 illustrates a schematic block diagram of a system for treatment of a wastewater fluid, according to another embodiment of the present invention.

Referring to FIG. 5, a schematic block diagram of a system 50 for treatment of wastewater fluid is illustrated, according to another embodiment of the present invention. The wastewater treatment system 50 differs from the system 10 in the fact that it further includes a contact tank 16 arranged downstream of the reactor apparatus 11. The contact tank 16 is hydraulically coupled to the hydraulic outlet 115 of the reaction chamber 111 via the outlet tube 18 to receive wastewater fluid leaving the reactor apparatus 11. The contact tank 16 is also pneumatically coupled to the pneumatic outlet (1111 in FIG. 2) of the gas chamber (113 in FIG. 2) via a gas product reclaiming tube 17 to receive the excess gas containing reaction gas products produced during the plasma discharge within the microbubbles and on the interface between the bubbles and the wastewater fluid in the reactor apparatus 11. The contact tank 16 utilizes this excess gas for additional Advanced Oxidation Processes within the wastewater fluid located in the contact tank, and thereby enhances treatment of the wastewater fluid.

According to an embodiment of the present invention, the outlet tube 18 connecting the reactor apparatus 11 to the contact tank 16 is a cone shaped tube operating on the basis of the Venturi effect. This provision can speed the flow of wastewater fluid entering the contact tank 16, by constricting it in the cone shaped tube. Such provision enables, inter alia, creating suction for the gas product reclaiming tube 17 and improving agitation in the contact tank 16.

Figure 6:
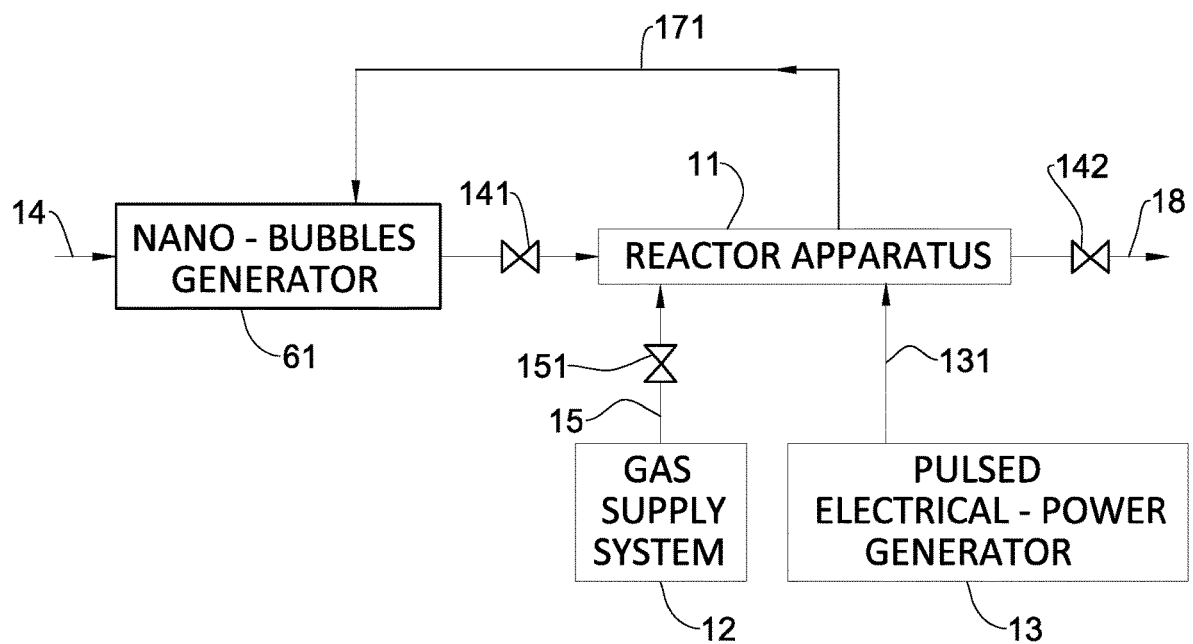
FIG. 6 illustrates a schematic block diagram of a system for treatment of a wastewater fluid, according to a further embodiment of the present invention.

Referring back to FIG. 6, a schematic block diagram of a wastewater treatment system 60 for treatment of a wastewater fluid is illustrated, according to a further embodiment of the present invention. The system 60 differs from the system (10 in FIG. 1) by that it further includes a nanobubble generator 61 arranged upstream of the reactor apparatus 11 for pre-treatment of wastewater fluid. The nanobubble generator 61 is pneumatically coupled to the gas chamber 113 via a gas product reclaiming tube 171 to receive excess gas containing reaction gas products produced during the plasma discharge in the reactor apparatus 11, and to generate nanobubbles of said gas in the wastewater fluid supplied for the treatment. The nanobubbles can further serve to infuse the gas product into the wastewater fluid, to improve a chemical saturation, to change a wastewater pH, etc. The nanobubbles also provide more sources for plasma discharge in the reactor apparatus 11, in addition to those created by the micro-bubbles 119 produced by introduction of the process gas into reaction chamber 111. According to an embodiment, pneumatic coupling can be established via coupling the gas product tube 171 to the pneumatic outlet (1111 in FIG. 2) of the gas chamber (113 in FIG. 2) of the reactor apparatus 11.

The nanobubble generator 61 is configured to receive the wastewater fluid supplied for treatment and enrich it with nanobubbles containing the reaction gas products supplied via the gas product reclaiming tube 171. An example of a nanobubble generator suitable for the purpose of the present invention is a nanobubble generator produced by the Moleaer company.

Figure 7:
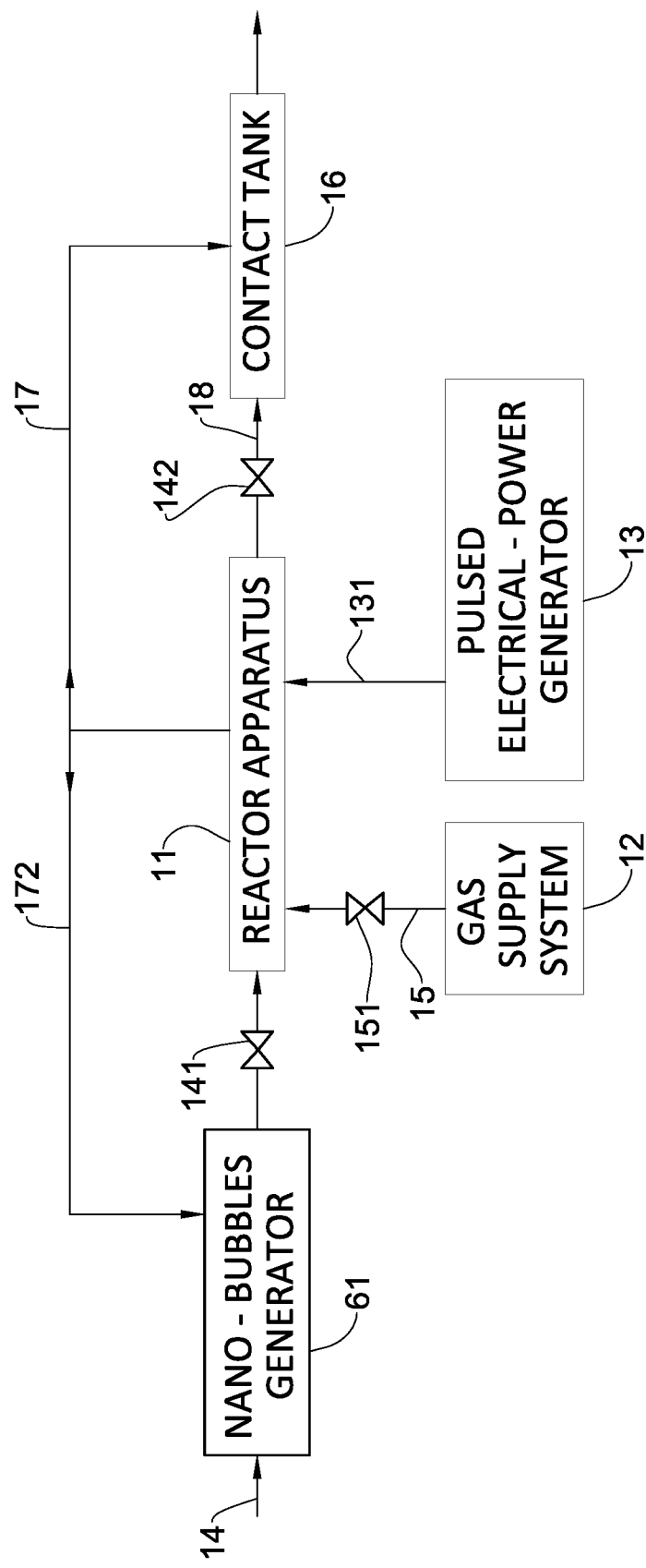
FIG. 7 illustrates a schematic block diagram of a system for treatment of a wastewater fluid, according to yet another embodiment of the present invention.

Referring to FIG. 7, a schematic block diagram of a wastewater treatment system 70 for treatment of wastewater fluid is illustrated, according to yet another embodiment of the present invention. The system 70 differs from the system 50 by that it further includes the nanobubble generator 61 described above, which is arranged upstream of the reactor apparatus 11 for pre-treatment of wastewater fluid. The nanobubble generator 61 is pneumatically coupled to the gas chamber 113 via a second gas product reclaiming tube 172, and is configured to receive excess gas containing reaction gas products produced during the plasma discharge in the reactor apparatus 11, and to generate nanobubbles in the wastewater fluid supplied for the treatment.

For example, pneumatic coupling can be established via coupling the second gas product tube 172 to the gas product reclaiming tube 17 which is connected to the pneumatic outlet (1111 in FIG. 2) of the gas chamber (113 in FIG. 2). Alternatively, the second gas product reclaiming tube 172 can be connected to another pneumatic outlet (not shown) of the gas chamber (113 in FIG. 2).

According to a further embodiment of the present invention, gas reclaiming tubes 17, 171, 172 may contain components (not shown) such as liquid separators, mist separators, vapor trap, flow compressors, etc., which are used in common industrial practice.

According to another embodiment of the present invention, gas reclaiming tubes 17, 171, 172 may have their function integrated with or assigned to the liquid-bearing tubes. For example, tubes 17 and 18 may be united to a single mixed stream tube.

Figure 8:
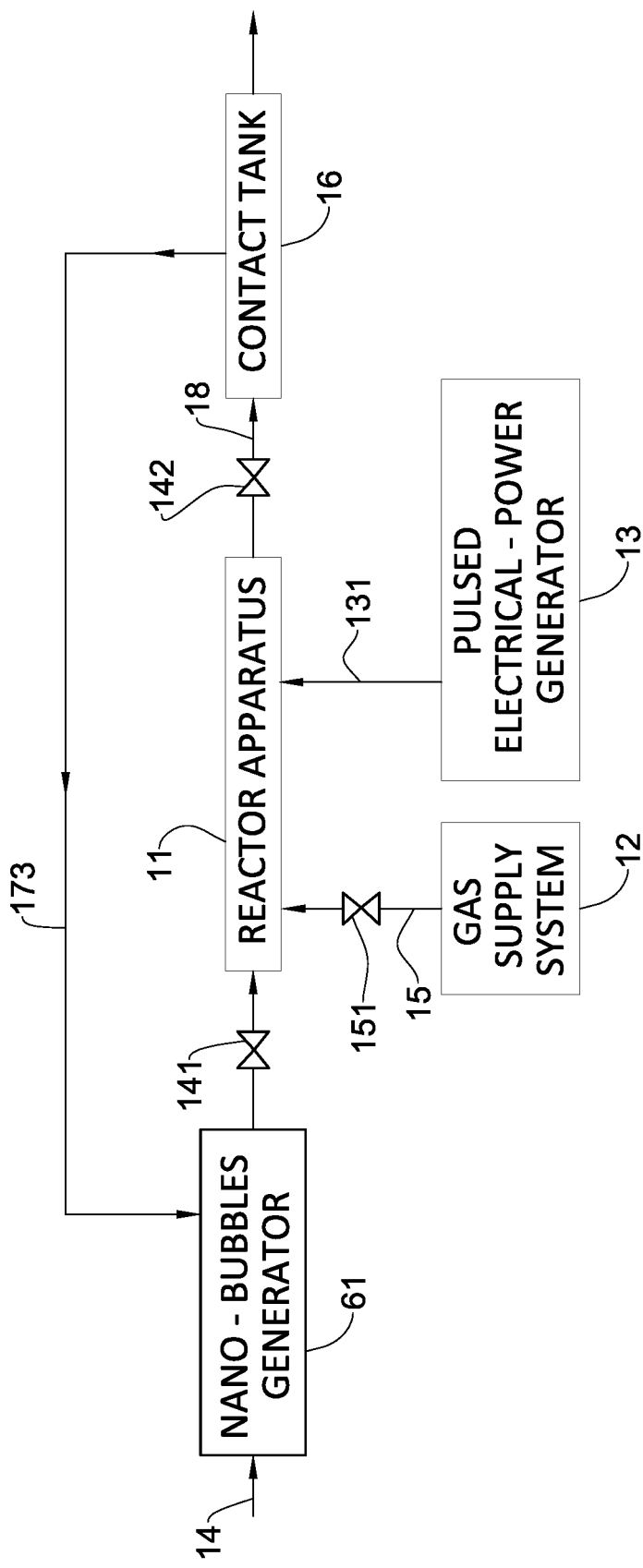
FIG. 8 illustrates a schematic block diagram of a system for treatment of a wastewater fluid, according to yet another embodiment of the present invention.

Referring to FIG. 8, a schematic block diagram of a wastewater treatment system 80 for treatment of wastewater fluid is illustrated, according to yet another embodiment of the present invention. The system 80 differs from the system 70 by that the excess gas collection function is transferred from the reactor apparatus 11 to the contact tank 16. Accordingly, the system 80 further includes a gas product reclaiming tube 173 pneumatically coupled to a pneumatic port (not shown) of the contact tank 16 to siphon the excess process gas back to the nanobubble generator 61, which is arranged upstream of the reactor apparatus 11 for pre-treatment of wastewater fluid. The wastewater fluid 14 is first infused with nanobubbles provided by the nanobubbles generator 61, and then proceeds to the reactor apparatus 11, where additional process gas is added and the plasma discharge treatment is applied. Then, the bubble-filled fluid and gas (as a mixed stream) flow through the conduit 18 to the contact tank 16, where they reside for sufficient time for the excess gas and the gas in the nanobubbles to percolate to the top of the contact tank 16 and then to proceed to the reclaiming tube 173. This configuration offers better conserving and reuse of the process gas and the discharge gas products.

According to some embodiments of the present invention, the nanobubble generator 61 can further be pneumatically coupled to the gas supply system 12 in addition to (or instead of) the pneumatic coupling to the gas chamber (113 in FIG. 2) of the reactor apparatus 11.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

It is to be understood that the phraseology and terminology employed herein are for the purpose of description and should not be regarded as limiting.

It should be noted that the words "comprising" and "including" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for treatment of a wastewater fluid comprising:
   a gas supply system configured to provide a process gas into the wastewater fluid;
   a pulsed electrical-power generator configured to generate high electrical voltage pulses;
   a reactor apparatus pneumatically coupled to the gas supply system, and electrically coupled to the pulsed electrical-power generator,
   wherein the reactor apparatus is configured to produce a plurality of gas microbubbles of the process gas injected into the wastewater fluid supplied into the reactor apparatus for the treatment, and to apply the high electrical voltage pulses generated by the pulsed electrical-power generator to said plurality of the microbubbles; the high electrical voltage pulses have energy sufficient to create a plasma glow discharge within the plurality of the microbubbles, and in an interface of the microbubbles with the wastewater fluid;
   wherein the reactor apparatus includes a housing comprising:
      a gas input plenum arranged at a lower portion of the housing and including a pneumatic inlet configured to receive the process gas from the gas supply system;
      a gas chamber arranged at an upper portion of the housing and including a pneumatic outlet for releasing reaction gas products collected at the gas chamber during the treatment of the wastewater fluid;
      a reaction chamber arranged between the gas input plenum and the gas chamber, the reaction chamber including:
         a hydraulic inlet for receiving a wastewater fluid;
         a hydraulic outlet for releasing the wastewater fluid from the reaction chamber after treatment;
      a supporting plate arranged at a bottom of the reaction chamber and separating the reaction chamber from the gas input plenum, the supporting plate configured to hold a plurality of tubular electrodes, each of the tubular electrodes including:
         a protruding portion that protrudes from the supporting plate and configured to provide a conductive or capacitive electrical coupling to the wastewater fluid treated in the reaction chamber, and
         a passing portion that passes through the supporting plate to provide pneumatic communication between the gas input plenum and the reaction chamber for supplying the reaction gas for production of said plurality of the microbubbles;
      and
      a grounded plate arranged at a top portion of the reaction chamber and separating the reaction chamber from the gas chamber, the grounded plate including a plurality of openings passing through the grounded plate towards the gas chamber to enable an excess gas mixture containing a chemically active gas released from the microbubbles reaching the grounded plate and other reaction gas products produced during the treatment to pass through the plurality of the openings and be collected in the gas chamber.

2. The system of claim 1, wherein each of the tubular electrodes is tapered or bifurcated to have a sharp or pointed top edge configured to concentrate and intensify a local electric field.

3. The system of claim 1, wherein the reactor apparatus further includes a potential electrode and a grounded electrode.

4. The system of claim 3, wherein said supporting plate arranged at the bottom of the reaction chamber and separating the reaction chamber from the gas input plenum is a potential plate being electrically conductive.

5. The system of claim 4, wherein the potential electrode is electrically connected to a bottom side of the potential plate, and a grounded electrode is electrically connected to a top side of the grounded plate.

6. The system of claim 4, wherein said supporting plate arranged at the bottom of the reaction chamber and separating the reaction chamber from the gas input plenum-is made from an electrically isolative material having a high dielectric strength.

7. The system of claim 3, wherein the potential electrode is electrically connected to the plurality of tubular electrodes via electrical wires.

8. The system of claim 3, wherein the potential electrode and the grounded electrode are coupled to the pulsed electrical-power generator via a low-impedance connection.

9. The system of claim 4, wherein the reaction chamber further comprises an insulator plate arranged on a top surface of the potential plate.

10. The system of claim 9, wherein the insulator plate includes a plurality of capillary openings passing through the potential plate towards the reaction chamber; the capillary openings are configured to tightly accommodate protruding portions of the tubular electrodes which protrude from the potential plate.

11. The system of claim 10, wherein a height of the protruding portions of the tubular electrodes is smaller than a total width of the insulator plate to form capillary holes within the capillary openings extending from a top surface of the insulator plate toward top edges of the protruding portions of the tubular electrodes.

12. The system of claim 11, wherein a diameter of the capillary holes is in a range of 0.1 mm to 5 mm.

13. The system of claim 11, wherein a width of the insulator plate is in a range of 5 mm to 50 mm, and a depth of the capillary holes is in a range of 1 mm to 10 mm.

14. The system of claim 11, wherein the capillary holes further include an insert arranged between inner walls of the capillary holes and the tubular electrodes.

15. The system of claim 14, wherein the process gas flows through the tubular electrodes to the reaction chamber under an intense electrical field and/or a catalyst action of the capillary holes.

16. The system of claim 1, further comprising a contact tank being hydraulically coupled to a reaction chamber of the reactor apparatus via an outlet tube to receive the wastewater fluid leaving the reaction chamber, and pneumatically coupled to the pneumatic outlet of the gas chamber via at least one gas product reclaiming tube to receive (i) the wastewater fluid after treatment in the reaction chamber, and (ii) the excess gas mixture containing unused process gas released from the microbubbles reaching the gas chamber and other reaction gas products produced during treatment with the high electrical voltage pulses.

17. The system of claim 16, wherein the outlet tube connecting the reactor apparatus to the contact tank is a cone shaped tube operating on the basis of the Venturi effect.

18. The system of claim 1, further comprising a nanobubble generator arranged upstream of the reactor apparatus for pre-treatment of the wastewater fluid supplied for the treatment, the nanobubble generator pneumatically coupled to the gas chamber of the reactor apparatus via a gas product reclaiming tube, the nanobubble generator configured to receive a gas mixture including unused process gas and reaction gas products produced during the plasma discharge within the microbubbles and in the interface between the microbubbles and the wastewater fluid, and to produce nanobubbles of the gas mixture in the wastewater fluid before the wastewater fluid enters the reaction chamber.

19. The system of claim 1, further comprising a nanobubble generator arranged upstream of the reactor apparatus for pre-treatment of the wastewater fluid supplied for the treatment, the nanobubble generator pneumatically coupled to the contact tank.

20. The system of claim 1, further comprising a nanobubble generator arranged upstream of the reactor apparatus for pre-treatment of the wastewater fluid supplied for the treatment, the nanobubble generator pneumatically coupled to the gas supply system.

21. A method for treatment of a wastewater fluid, comprising:
providing the system for treatment of a wastewater fluid of claim 1;
receiving the wastewater fluid for the treatment;
producing a plurality of gas microbubbles of a process gas in the wastewater fluid, and
applying high electrical voltage pulses to said plurality of the microbubbles; the high electrical voltage pulses having energy sufficient to create a plasma glow discharge within the plurality of the microbubbles, and in an interface of the microbubbles with the wastewater fluid.

22. The method of claim 21, wherein a voltage amplitude of the high electrical voltage pulses is in the range sufficient to create localized electrical fields capable of electrically activating and ionizing the process gas.

23. The method of claim 21, wherein a voltage amplitude of the high electrical voltage pulses is in the range sufficient to reach 5.2 eV electron plasma temperature and to split $O_2$ gas in order to react with $H_2O$ and $O_2$ and to produce *OH and $O_3$ by using an electrical field in the range of 30 kV/cm to 60 kV/cm with a peak pulsed current in the range of 100 A to 5 kA.

24. The method of claim 21, wherein a pulse width of the high electrical voltage pulses is in the range of 10 nanoseconds to 100 nanoseconds.

25. The method of claim 21, wherein a pulse repetition rate is in the range of 10 pps to $10 \times 10^3$ pps.

26. A method for treatment of a wastewater fluid, comprising:
receiving the wastewater fluid for the treatment;
producing a plurality of gas microbubbles of a process gas in the wastewater fluid, and
applying high electrical voltage pulses to said plurality of the microbubbles; the high electrical voltage pulses having energy sufficient to create a plasma glow discharge within the plurality of the microbubbles, and in an interface of the microbubbles with the wastewater fluid;
collecting an excess gas mixture containing the process gas released from the microbubbles and other reaction gas products produced during treatment of the wastewater fluid with the high electrical voltage pulses; and
applying the excess gas mixture to the wastewater fluid treated by the plasma glow discharge through a cone shaped tube operating on the basis of the Venturi effect for continuation of treatment of the wastewater fluid.

27. A method for treatment of a wastewater fluid, comprising:
receiving the wastewater fluid for the treatment;
producing a plurality of gas microbubbles of a process gas in the wastewater fluid, and
applying high electrical voltage pulses to said plurality of the microbubbles; the high electrical voltage pulses having energy sufficient to create a plasma glow discharge within the plurality of the microbubbles, and in an interface of the microbubbles with the wastewater fluid;
collecting an excess gas mixture containing the process gas released from the microbubbles and other reaction gas products produced during treatment with the high electrical voltage pulses;
producing nanobubbles containing the excess gas mixture; and
pretreating the wastewater fluid by injecting the nanobubbles into the wastewater fluid before transferring the wastewater fluid into the reaction chamber.

* * * * *